(12) United States Patent
Sim et al.

(10) Patent No.: US 11,943,441 B2
(45) Date of Patent: *Mar. 26, 2024

(54) INVERSE QUANTIZATION DEVICE AND METHOD USED IN VIDEO DECODING DEVICE

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Jong Seok Lee, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,588

(22) Filed: Nov. 16, 2022

(65) Prior Publication Data
US 2023/0071246 A1    Mar. 9, 2023

Related U.S. Application Data

(63) Continuation of application No. 17/294,288, filed as application No. PCT/KR2020/006438 on May 15, 2020, now Pat. No. 11,570,439.

(30) Foreign Application Priority Data

May 15, 2019 (KR) .................. 10-2019-0056976
Aug. 6, 2019 (KR) .................. 10-2019-0095450
May 15, 2020 (KR) .................. 10-2020-0058328

(51) Int. Cl.
*H04N 19/124* (2014.01)
*H04N 19/105* (2014.01)
(Continued)

(52) U.S. Cl.
CPC ......... *H04N 19/124* (2014.11); *H04N 19/105* (2014.11); *H04N 19/176* (2014.11); *H04N 19/18* (2014.11)

(58) Field of Classification Search
None
See application file for complete search history.

(56) References Cited

U.S. PATENT DOCUMENTS 10,321,131 B2 *  6/2019  Sze .................. H04N 19/91
2016/0269684 A1  9/2016  Lim et al.
(Continued)

FOREIGN PATENT DOCUMENTS

EP          3485644 B1    8/2020
KR    10-2015-0083012 A   7/2015
(Continued)

OTHER PUBLICATIONS

International Search Report dated Aug. 20, 2020, in corresponding PCT Application No. PCT/KR2020/006419.
(Continued)

*Primary Examiner* — Chikaodili E Anyikire
(74) *Attorney, Agent, or Firm* — Fox Rothschild LLP

(57) ABSTRACT

An inverse quantization method is implemented by an inverse quantization device, the method configured for acquiring quantized coefficients, estimating a quantization parameter in quantization groups or quantization parameter prediction group units, generating an inverse quantization matrix for adaptive quantization, and generating transform
(Continued)

coefficients from the quantized coefficients using the quantization parameter and the inverse quantization matrix.

9 Claims, 12 Drawing Sheets

(51) Int. Cl.
*H04N 19/176* (2014.01)
*H04N 19/18* (2014.01)

(56) References Cited

U.S. PATENT DOCUMENTS

| | | |
|---|---|---|
| 2018/0192074 A1 | 7/2018 | Shih et al. |
| 2019/0191170 A1 | 6/2019 | Zhao et al. |
| 2019/0373287 A1 | 12/2019 | Lim et al. |
| 2020/0112723 A1* | 4/2020 | Tanaka ................. H04N 19/103 |
| 2020/0322606 A1 | 10/2020 | Horowitz et al. |
| 2021/0227221 A1* | 7/2021 | Lim ....................... H04N 19/70 |

FOREIGN PATENT DOCUMENTS

| | | |
|---|---|---|
| KR | 10-2018-0028299 A | 3/2018 |
| KR | 10-2019-0029735 A | 3/2019 |

OTHER PUBLICATIONS

B. Choi et al., "AHG12: On sub-picture partitioning JVET-N0055-v2 Joint Video Experts Teat (JVET) of ITU-T SG 16 WP 3 and ISOVIEC JTC 1/SC 29/WG 11", 14th Meeting, Geneva, CH. Mar. 20, 2019, pp. 1-7.

* cited by examiner (a)

(b)

INVERSE QUANTIZATION DEVICE AND METHOD USED IN VIDEO DECODING DEVICE

CROSS-REFERENCE TO RELATED APPLICATION

This Application is a Continuation of application Ser. No. 17/294,288 filed on May 14, 2021, which is incorporated herein by reference in its entirety. Application Ser. No. 17/294,288 is a National Phase application filed under 35 USC 371 of PCT International Application No. PCT/KR2020/006438, with an International Filing Date of May 15, 2020, which claims priority to Korean Patent Application No. 10-2020-0058328 filed on May 15, 2020, Korean Patent Application No. 10-2019-0095450 filed on Aug. 6, 2019, and Korean Patent Application No. 10-2019-0056976 filed on May 15, 2019, which are incorporated herein by reference in their entirety.

BACKGROUND

(a) Technical Field

The present disclosure relates to an inverse quantization device and method used in a video decoding apparatus, more particularly, to the inverse quantization device and method for acquiring quantized coefficients, calculating a quantization parameter, generating an inverse quantization matrix, and generating transform coefficients from the quantized coefficients using the quantization parameter and the inverse quantization matrix.

(b) Description of the Related Art

Since the volume of video data typically is larger than that of voice data or still image data, storing or transmitting video data without processing for compression requires a significant amount of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, for video data, the image size, resolution, and frame rate are gradually increasing, and accordingly the amount of data to be encoded is also increasing. Accordingly, a new compression technique having better encoding efficiency and higher image quality than the existing compression technique is required.

SUMMARY

An object of the present disclosure is to provide an inverse quantization device and method for acquiring quantized coefficients, calculating a quantization parameter in a unit of a quantization group or a quantization parameter prediction group, generating an inverse quantization matrix for adaptive quantization, and generating transform coefficients from the quantized coefficients using the quantization parameter and the inverse quantization matrix.

In accordance with one aspect of the present disclosure, an inverse quantization method is implemented by an inverse quantization device, and the method includes: decoding information about a current block, information about quantized coefficients, information about a quantization parameter, a delta index for an inverse quantization matrix, and delta coefficients of the inverse quantization matrix from a bitstream; calculating a quantization parameter based on the information about the quantization parameter; calculating an inference identifier (ID) from the information about the current block and selecting an inverse quantization matrix indicated by the inference ID, wherein a list for the inverse quantization matrix is pre-generated, and an inverse quantization matrix included in the list is generated using a predictive inverse quantization matrix calculated based on the delta index, and delta inverse quantized data generated from the delta coefficients; and generating transform coefficients from the quantized coefficients using the quantization parameter and the selected inverse quantization matrix.

In accordance with another aspect of the present disclosure, an inverse quantization device includes: an entropy decoder configured to decode information about a current block, information about quantized coefficients, information about a quantization parameter, a delta index for an inverse quantization matrix, and delta coefficients of the inverse quantization matrix from a bitstream; a quantization parameter calculator configured to calculate a quantization parameter based on the information about the quantization parameter; an inverse quantization matrix generator configured to calculate an inference identifier (ID) from the information about the current block and select an inverse quantization matrix indicated by the inference ID; and a transform coefficient generator configured to generate transform coefficients from the quantized coefficients using the quantization parameter and the selected inverse quantization matrix, wherein a list for the inverse quantization matrix is pre-generated, and an inverse quantization matrix included in the list is generated using a predictive inverse quantization matrix calculated based on the delta index, and delta inverse quantized data generated from the delta coefficients.

As apparent from the foregoing, according to the present embodiment, an inverse quantization device and method for acquiring quantized coefficients, calculating a quantization parameter in a unit of a quantization group or a quantization parameter prediction group, generating an inverse quantization matrix for adaptive quantization, and generating transform coefficients from the quantized coefficients using the quantization parameter and the inverse quantization matrix is provided. Thereby, compression performance of video encoding and decoding apparatuses may be improved.

DETAILED DESCRIPTION

Figure 1:
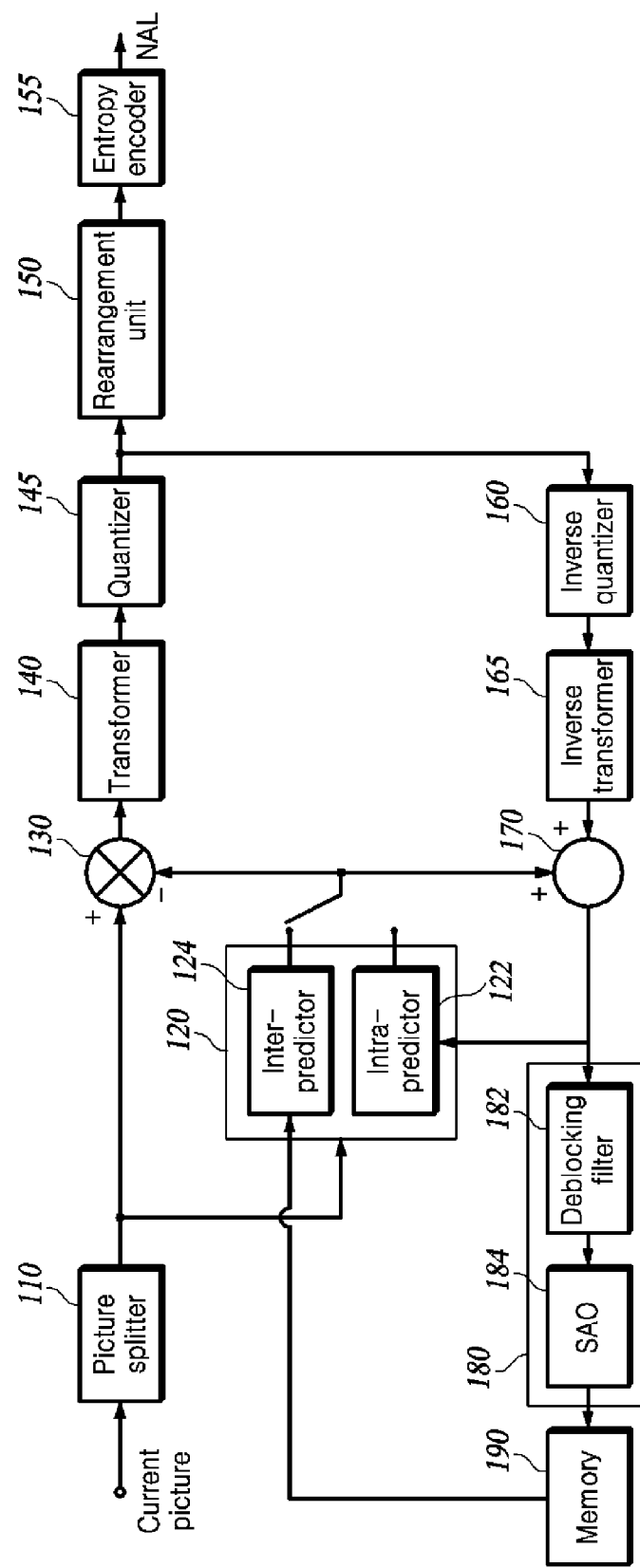
FIG. 1 is an exemplary block diagram of a video encoding apparatus capable of implementing the techniques of the present disclosure.

Hereinafter, embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the embodiments, a detailed description of known functions and configurations incorporated herein will be omitted to avoid obscuring the subject matter of the embodiments.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video typically includes a plurality of pictures. Each picture is split into a plurality of regions, and encoding is performed on each region. For example, one picture is split into one or more tiles or/and slices. The one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. BTTT may be collectively referred to as a multiple-type tree (MTT).

Figure 2:
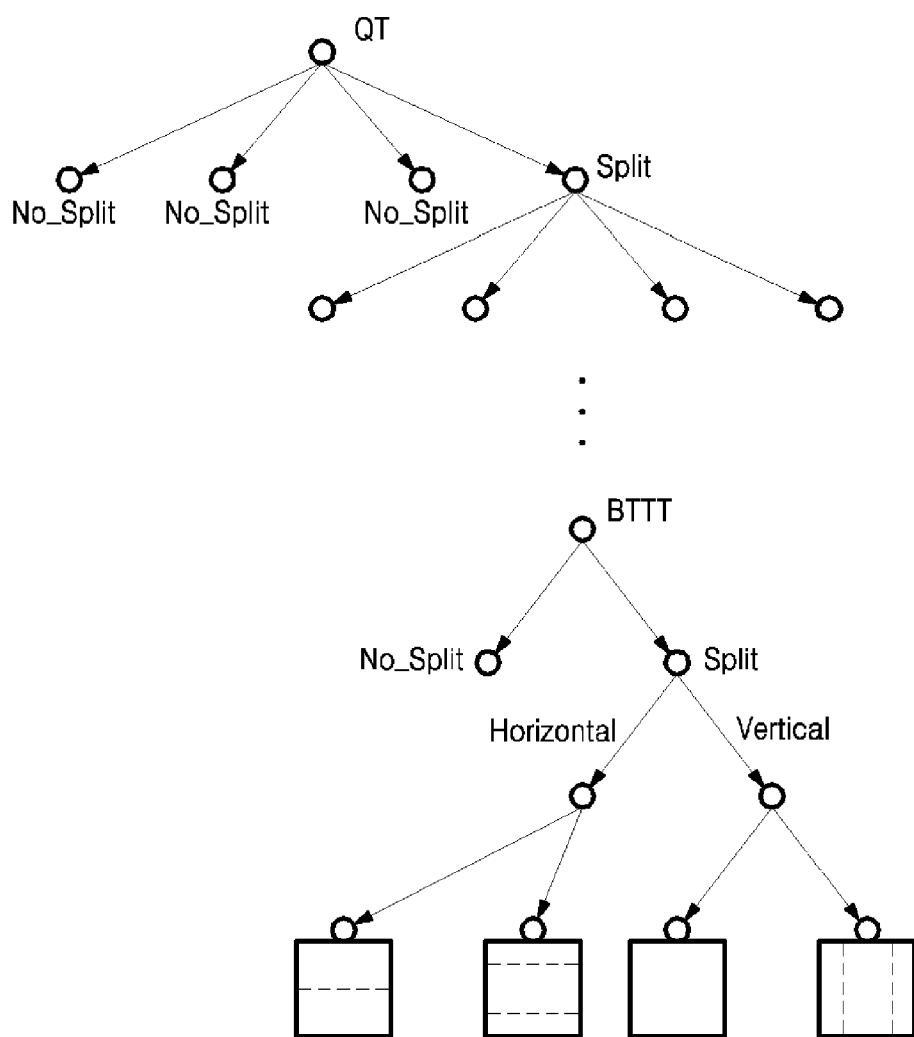
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into a block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
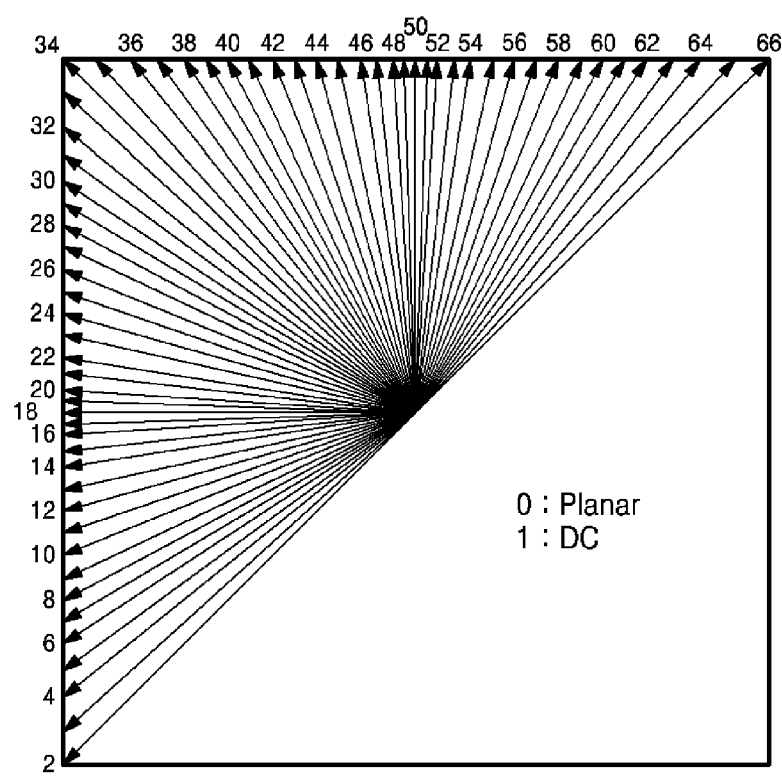
FIGS. 3A and 3B exemplarily show a plurality of intra prediction modes including wide-angle intra prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

Figure 3B:
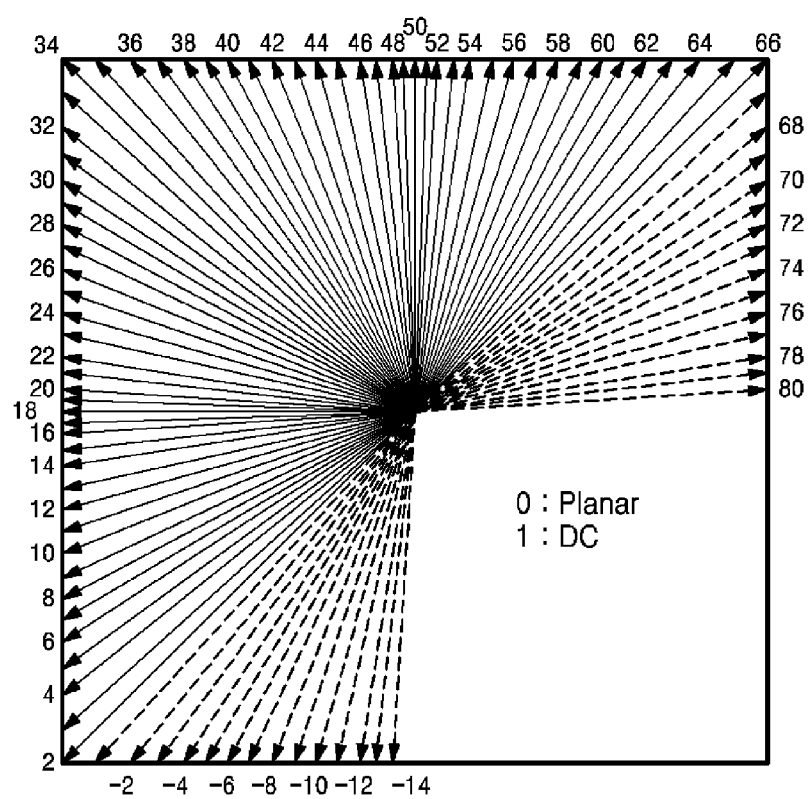

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 subtracts the prediction block generated by the intra-predictor 122 or the inter-predictor 124 from the current block to generate a residual block.

The transformer 140 transforms the residual signal in the residual block having pixel values in the spatial domain into transform coefficients in the frequency domain. The transformer 140 may transform residual signals in the residual block using the entire size of the residual block as a transformation unit. Alternatively, it may split the residual block into a plurality of subblocks, and perform the transformation using the subblock as a transform unit. Alternatively, the residual signals may be transformed by dividing the block into two subblocks, which are a transform region and a non-transform region, and using only the transform region subblock as a transform unit. The transform region subblock may be one of two rectangular blocks having a size ratio of 1:1 based on the horizontal axis (or vertical axis). In this case, a flag (cu_sbt_flag) indicating that only subblocks have been transformed, directionality (vertical/horizontal) information (cu_sbt_horizontal_flag) and/or position information (cu_sbt_pos_flag) are encoded by the entropy encoder 155 and signaled to the video decoding apparatus. In addition, the size of the transform region subblock may have a size ratio of 1:3 based on the horizontal axis (or vertical axis). In this case, a flag (cu_sbt_quad_flag) distinguishing the corresponding splitting is additionally encoded by the entropy encoder 155 and signaled to the video decoding apparatus.

The transformer 140 may transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus. The size of the transform block to which the MTS is applied may be limited to be within 32×32.

The quantizer 145 quantizes transform coefficients output from the transformer 140, and outputs the quantized transform coefficients to the entropy encoder 155.

The rearrangement unit 150 may reorganize the coefficient values for the quantized residual value.

The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 encodes the one-dimensional quantized transform coefficients output from the rearrangement unit 150 using uses various encoding techniques such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 180 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
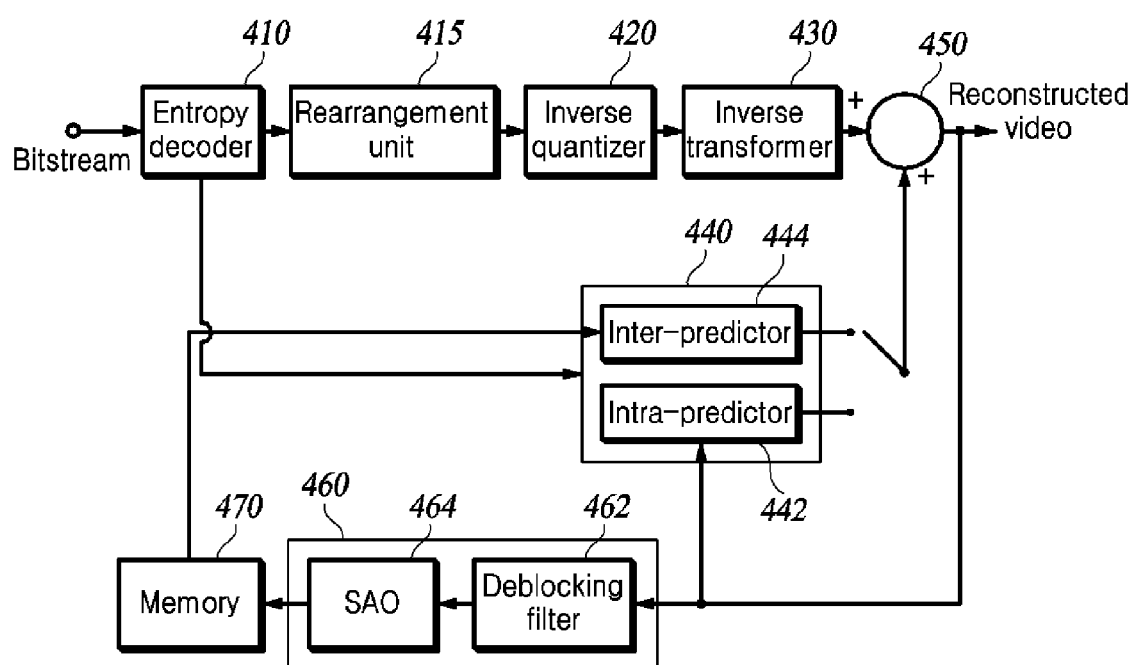
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

The entropy decoder 410 also extracts information about quantized transform coefficients of the current block as information about the residual signal.

The rearrangement unit 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 inversely quantizes the quantized transform coefficients. The inverse transformer 430 inversely transforms the inversely quantized transform coefficients from the frequency domain to the spatial domain to reconstruct residual signals, thereby generating a residual block for the current block.

In addition, when the inverse transformer 430 inversely transforms only a partial region (subblock) of the transform block, it extracts a flag (cu_sbt_flag) indicating that only the subblock of the transform block has been transformed, the directionality (vertical/horizontal) information about the subblock (cu_sbt_horizontal_flag), and/or position information about the subblock (cu_sbt_pos_flag), and inversely transforms the transform coefficients of the subblock from the frequency domain to the spatial domain. Then, it reconstructs residual signals, and fills a region that is not inversely transformed with the value of "0" as a residual block, thereby generating the final residual block for the current block.

In addition, when the MTS is applied, the inverse transformer 430 determines transform functions or transform matrices to be applied in the horizontal and vertical directions, respectively, using the MTS information (mts_idx) signaled from the video encoding apparatus, and uses the determined transform functions to inversely transform the transform coefficients in the transform block in the horizontal and vertical directions.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode.

The inter-predictor 444 determines a motion vector of the current block and a reference picture referred to by the motion vector using the syntax element for the inter-prediction mode extracted from the entropy decoder 410, and predicts the current block based on the motion vector and the reference picture.

The adder 450 reconstructs the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The present embodiment discloses a new quantization technique that may be implemented by the decoding apparatus described above. In particular, provided herein are an inverse quantization device and method for acquiring quantized coefficients, calculating a quantization parameter, generating an inverse quantization matrix, and generating transform coefficients from the quantized coefficients using the quantization parameter and the inverse quantization matrix.

Figure 5:
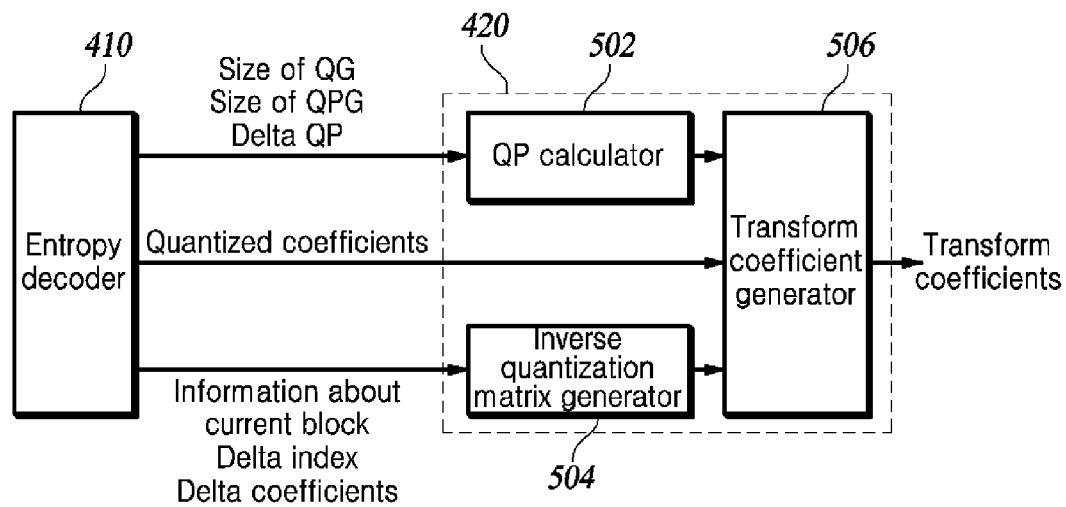
FIG. 5 is a block diagram of an inverse quantization device according to an embodiment of the present disclosure.

FIG. 5 is a block diagram of an inverse quantization device according to an embodiment of the present disclosure.

In an embodiment according to the present disclosure, an inverse quantization device 500 acquires quantized coefficients and a delta quantization parameter (hereinafter, delta QP), calculates a quantization parameter (QP) on a per quantization group (QG) basis or a per quantization parameter prediction group (QPG) basis using the delta QP and a predicted QP, generates an inverse quantization matrix for adaptive quantization, and generates transform coefficients from the quantized coefficients using the QP and the inverse quantization matrix. In order to generate transform coefficients for generating a residual signal for the current block, the inverse quantization device 500 includes an entropy decoder 410 and the inverse quantizer 420 included in the decoding apparatus.

The inverse quantizer 160 included in the encoding apparatus operates similarly to the inverse quantizer 420 included in the decoding apparatus, and thus the inverse quantizer 420 included in the decoding apparatus will be mainly described below.

The entropy decoder 410 decodes, from a bitstream, information on the current block, the quantized coefficients, the size of a QG, the size of a QPG, the delta QP, a delta index for the inverse quantization matrix, and delta coefficients of the inverse quantization matrix. The quantized coefficients are generated by the quantizer 145 included in the encoding apparatus.

As described above, the current block represents a block corresponding to the CU to be encoded or decoded. The decoding apparatus generates a prediction block based on the information on prediction, and reconstructs the current block by adding a residual signal corresponding to the generated prediction block. The predicted signal may be generated using at least one of inter prediction, intra prediction, or intra block signal copy based on a prediction mode, reference picture information, motion vector information, and motion vector accuracy information. The decoding apparatus may generate an inverse transform block by performing entropy decoding on the bitstream, and generate a residual signal by performing at least one of inverse quantization and inverse transform on the inverse transform block. Therefore, the information on the current block may include information necessary for generation of a prediction block, an inverse transform block, and a residual signal, and reconstruction of the current block. The information on the current block may include, for example, a prediction mode, a size of the current block, and information about whether the current block is luma or chroma.

In the inverse quantizer 420, the QP (actually, delta QP) may be applied on a per QG basis. As provided herein, QG means a CU of the smallest size in which delta QP may be transmitted. The delta QP is not transmitted from the encoding apparatus on a per transform unit (TU) or CU basis. For CUs having a size smaller than the QG, the delta QP is transmitted once for a QG including the smaller CUs, and all CUs in the QG share the delta QP. On the other hand, for CUs whose size is greater than or equal to the QG size, the delta QP may be transmitted on a per QG basis or one delta QP may be transmitted for each CU.

Figure 6:
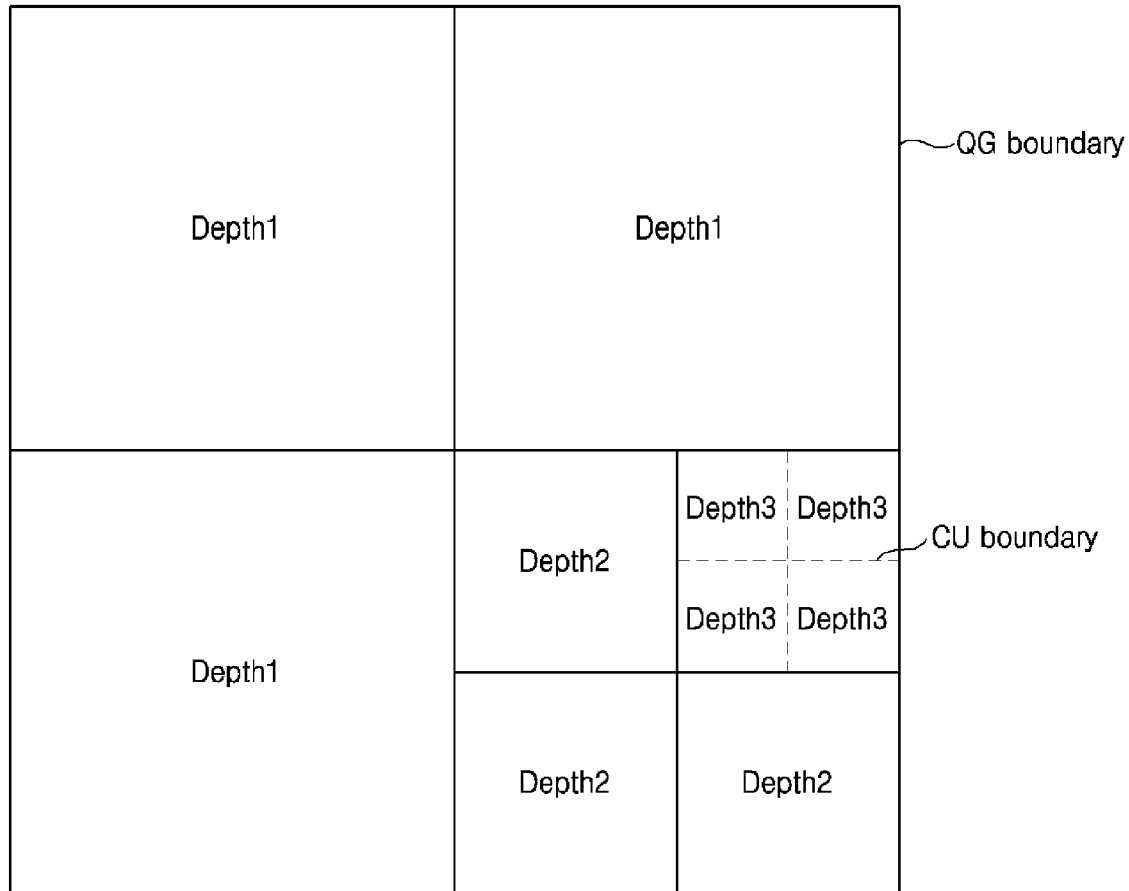
FIG. 6 is a conceptual diagram illustrating the size of a QG according to an embodiment of the present disclosure.

FIG. 6 is a conceptual diagram illustrating the size of a QG according to an embodiment of the present disclosure.

In this embodiment, the entropy decoder 410 decodes cu_qp_delta_enabled_flag from the bitstream and checks whether encoding is performed using various QPs for each block. When cu_qp_delta_enabled_flag is 1, the entropy decoder 410 may additionally decode diff_cu_qp_delta_depth from the bitstream to determine the size of the QG. The value diff_cu_qp_delta_depth is a difference between the depth of the minimum coding unit to which the delta QP (consisting of cu_qp_delta_abs indicating the size and cu_qp_delta_sign_flag indicating a sign) is applied and the depth of the maximum coding tree. Accordingly, for blocks having a depth of the current block greater than diff_cu_qp_delta_depth, the delta QP of a block corresponding to the previous depth in order is used without predicting and encoding/decoding the delta QP.

FIG. 6 shows an example of a QG for a case that diff_cu_qp_delta_depth is 2. Since CUs having a depth of 3 are inside a QG having a depth of 2, they use the same delta QP.

In consideration of presence of various types of blocks, the inverse quantizer 420 may predict the QP on a per QPG basis. That is, in this embodiment, a unit in which the delta QP is transmitted or determined may be different from a unit in which the QP is predicted. In this embodiment, when diff_cu_qp_delta_depth is not 0, the entropy decoder 410 decodes cu_qp_sep_pred_flag from the bitstream to check whether the sizes of QPG and QG are equal to each other. When cu_qp_sep_pred_flag is 1, that is, when the sizes of QG and QPG are not equal to each other, the entropy decoder 410 may determine the size of the QPG by decoding diff_cu_qp_pred_depth from the bitstream. The QG may include one or more QPGs, or the QPG may include one or more QGs, and each of the QP and QPG cannot exist across boundary of each other.

In another embodiment according to the present disclosure, the encoding apparatus and the decoding apparatus may determine the same size of QPG based on the split depth of the quad tree (QT), the split depth of the binary tree (BT), and the split depth of the ternary tree (TT). Alternatively, the encoding apparatus and the decoding apparatus may determine the same size of QPG based on the number of horizontal pixels and the number of vertical pixels of the CU or TU block.

In another embodiment according to the present disclosure, the encoding apparatus and the decoding apparatus may use the size of the QPG in a preset unit. Alternatively, the decoding apparatus may determine the size of the QPG based on the type of a tile group (TG), an index of a temporal layer, and a picture order count, chroma-space sub-sampling, a frame rate, a picture resolution, and the like.

In this embodiment, an inverse quantization matrix is generated using a predictive quantization matrix and delta inverse quantized data. In addition, a direct current (DC) item of the inverse quantization matrix may be generated using predictive inverse quantized DC and delta inverse quantized DC.

The delta index for the inverse quantization matrix may be used in calculating the predictive quantization matrix and the predictive inverse quantized DC.

The delta coefficients of the inverse quantization matrix may be used in calculating a list of delta inverse quantized data and a list of delta inverse quantized DCs. The list of delta inverse quantized data may include delta inverse quantized data for each of N indexes (where N is a natural number), and the list of delta inverse quantized DCs may include a delta inverse quantized DC for each of M indexes (where M is a natural number less than or equal to N).

The entropy decoder 410 may decode only K delta coefficients (where K is a natural number) corresponding to some of the delta inverse quantized data for one index.

In another embodiment according to the present disclosure, the decoding apparatus may adaptively acquire information about the size, form, and coefficients of the inverse quantization matrix using at least one of horizontal and vertical lengths of an inverse transform block, the size of the inverse transform block, an inverse transform kernel, the number of inverse transforms, the type of a decoded signal, a prediction mode of a prediction block, temporal layer values of the prediction block and an image containing the prediction block, and information about a bit depth.

The inverse quantizer 420 according to the embodiment calculates a QP using the delta QP and the predicted QP on a per QG basis or a per QPG basis, generates an inverse quantization matrix using the delta index for the inverse quantization matrix and the delta coefficients of the inverse quantization matrix, and generates transform coefficients from the quantized coefficients using the QP and the inverse quantization matrix. The transform coefficients are transmitted to the inverse transformer 430 to generate a residual signal for the current block. The inverse quantizer 420 includes all or part of a QP calculator 502, an inverse quantization matrix generator 504, and a transform coefficient generator 506.

The QP calculator 502 according to the embodiment calculates the QP using the delta QP and the predicted QP on a per QG basis or a per QPG basis.

Figure 7:
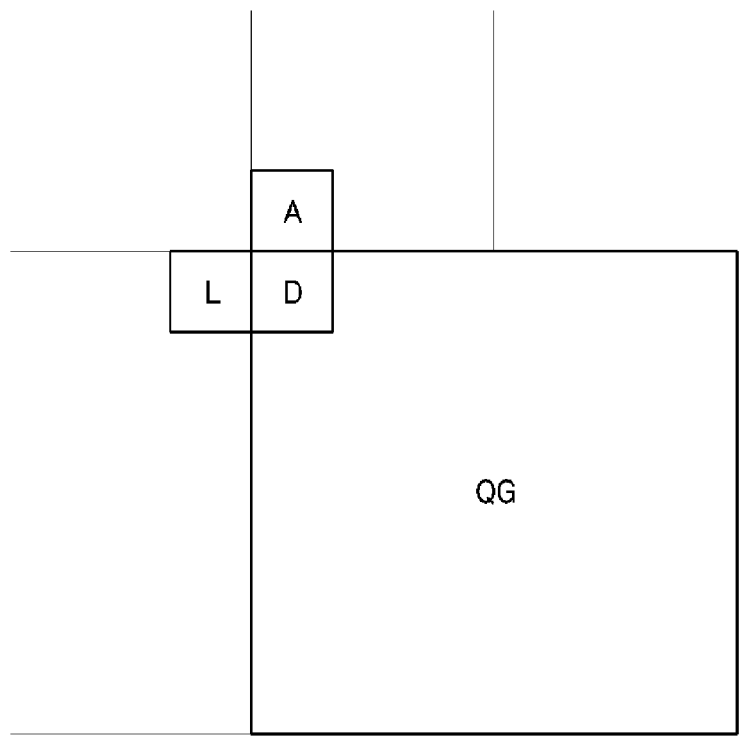
FIG. 7 illustrates a method of calculating a QP on a per QG basis according to an embodiment of the present disclosure.

FIG. 7 illustrates a method of calculating a QP on a per QG basis according to an embodiment of the present disclosure.

When the QP and QPG have the same size, the QP calculator 502 may calculate the QP for the QG unit (e.g., CU) as shown in Equation 1.

$$QP_{QG} = DQP_D + \frac{QP_A + QP_L}{2} + QP_{offset} \quad \text{[Equation 1]}$$

With respect to the top left position D of a QG, a block containing A is positioned above D, and a block containing L is positioned on the left of D. Further, $QP_A$ is a QP at position A, $QP_L$ is a QP at position L, and $DQP_D$ is a delta QP at position D. $QP_{offset}$ is a preset offset for QP calculation. As shown in Equation 1, the QP calculator 502 may predict the QP for QG by averaging the QP at position A and the QP at position L, and then calculate $QP_{QG}$, which is a quantization parameter for the QG, by adding the predicted QP for QG, the delta QP at position D, and the preset offset.

Figure 8:
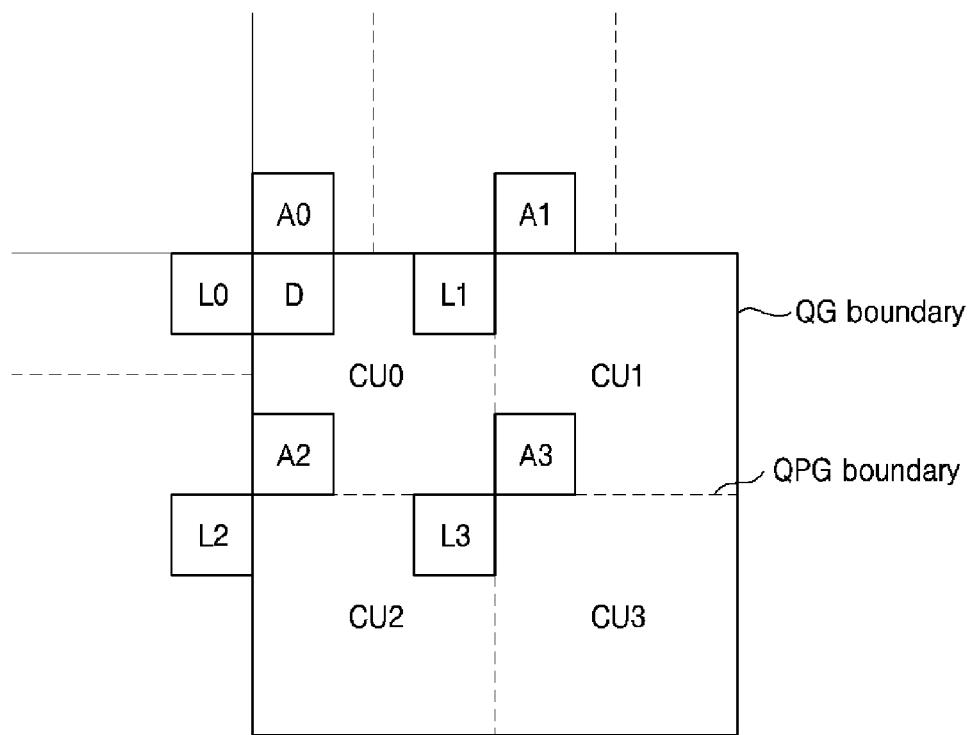
FIG. 8 is an exemplary diagram for calculation of a QP on a per QPG basis when the size of QG is larger than QPG according to an embodiment of the present disclosure.

FIG. 8 is an exemplary diagram for calculation of a QP on a per QPG basis when the size of QG is larger than QPG according to an embodiment of the present disclosure.

When the size of the QG is larger than that of the QPG, and the QPG and the CU have the same size, the QP calculator 502 may calculate the QP for the QPG unit as shown in Equation 2.

$$QP_{CU0} = DQP_D + \frac{QP_{A0} + QP_{L0}}{2} + QP_{offset} \quad \text{[Equation 2]}$$
$$QP_{CU1} = DQP_D + \frac{QP_{A1} + QP_{L1}}{2} + QP_{offset}$$
$$QP_{CU2} = DQP_D + \frac{QP_{A2} + QP_{L2}}{2} + QP_{offset}$$
$$QP_{CU3} = DQP_D + \frac{QP_{A3} + QP_{L3}}{2} + QP_{offset}$$

With respect to the top left position D of the QG, position Ai (i=0, . . . , 3) is located above the QPG (CU0, CU1, CU2 or CU3), and position Li (i=0, . . . , 3) is located on the left of the QPG. $QP_{Ai}$ is the QP of position Ai, $QP_{Li}$ is the QP of position Li, and $DQP_D$ is the delta QP of the QG. As shown in Equation 2, the QP calculator 502 may predict the QP for each QPG by averaging the QP at position Ai and the QP at position Li, and then calculate a QP for each QPG by adding the predicted QP for each QPG, the delta QP of the QG, and a preset offset.

Figure 9:
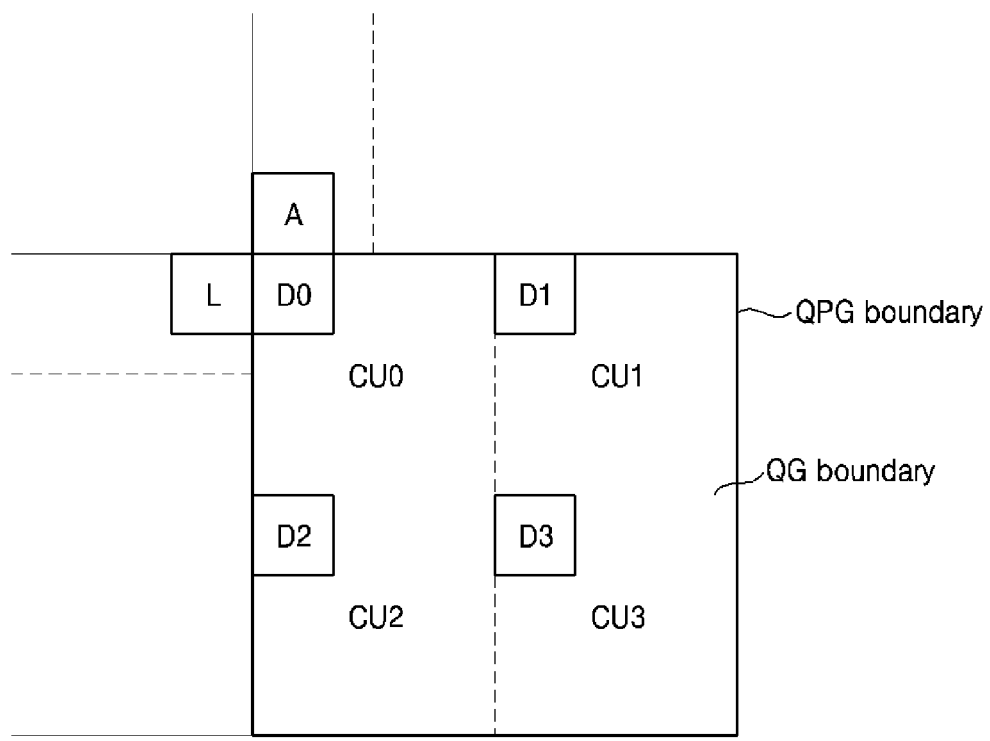
FIG. 9 is an exemplary diagram for calculating QP in units of QG when the size of QPG is larger than QG according to an embodiment of the present disclosure.

FIG. 9 is an exemplary diagram for calculating QP in units of QG when the size of QPG is larger than QG according to an embodiment of the present disclosure.

When the size of the QPG is larger than that of the QG, and the QG and the CU have the same size, the QP calculator 502 may calculate the QP for the QG unit as shown in Equation 3.

$$QP_{CU0} = DQP_{D1} + \frac{QP_A + QP_L}{2} + QP_{offset} \quad \text{[Equation 3]}$$

$$QP_{CU1} = DQP_{D2} + \frac{QP_A + QP_L}{2} + QP_{offset}$$
$$QP_{CU2} = DQP_{D3} + \frac{QP_A + QP_L}{2} + QP_{offset}$$
$$QP_{CU3} = DQP_{D4} + \frac{QP_A + QP_L}{2} + QP_{offset}$$

With respect to position D0 at the top left of the QG (CU0), position A is located above the QG, and position L is located on the left of the QG. $QP_A$ is the QP of position A, $QP_L$ is the QP of position L, and $DQP_{Di}$ (i=0, . . . , 3) is the delta QP of the QG (CU0, CU1, CU2 or CU3). As shown in Equation 3, the QP calculator 502 may predict the QP for the QPG by averaging the QP at position A and the QP at position L, and then calculate the QP for each QG by adding the predicted Qp for the QPG, $DQP_{Di}$ which is the delta QP of the QG, and a preset offset.

In another embodiment according to the present disclosure, the QP calculator 502 may select the QPs of neighboring blocks above and on the left of a QP calculation unit (e.g., QG or QPG) based on the number of horizontal pixels and the number of vertical pixels of the QP calculation unit to predict the QP for the QP calculation unit.

In another embodiment according to the present disclosure, when the current block is a chroma block and has a single-tree structure, the QP calculator 502 may predict the QP for the chroma block by selecting the QP of the luma block corresponding to the same position as the current block. On the other hand, when the current block is a chroma block and has a dual-tree structure, the QP calculator 502 may predict the QP for the chroma block by selecting the QP of the luma block corresponding to the center position of the QPG to. Alternatively, the QP for the chroma block may be predicted based on the QPs of all luma blocks corresponding to the QPG.

In another embodiment according to the present disclosure, when the current TG is a P (Predictive) or B (Bi-directional) TG, the intra QP prediction mode or inter QP prediction mode is determined based on statistics of the prediction modes of subblocks of the current QPG. In the case that the intra QP prediction mode is determined, the QP calculator 502 may predict the QP using one of all methods described above. On the other hand, in the case that the inter-QP prediction mode is determined, the QP calculator 502 may predict the QP by calculating the motion vector and a reference picture list index and selecting a QP value of a block corresponding to the position of the motion vector of a picture corresponding to the reference picture list index. In the case of the bidirectional inter prediction mode, the QP may be predicted based on the QPs predicted in each direction.

In another embodiment according to the present disclosure, after receiving one or more indexes specifying a table in which QPs used in TUs of the previous block are stored, the QP calculator 502 may predict the QP using QPs specified by the index.

The inverse quantization matrix generator 504 according to the present embodiment calculates an inference Identifier (ID) from information on the current block, and selects an inverse quantization matrix indicated by the inference ID.

The inverse quantization matrix generator 504 generates an inference ID using the information on the current block (e.g., prediction mode, size, luma and chroma information, etc.). The inverse quantization matrix generator 504 selects an inverse quantization matrix indicated by the inference ID in the list of inverse quantization matrices.

For selection of an inverse quantization matrix, the inverse quantization matrix generator 504 generates a list of inverse quantization matrices for N indices. This list may include an inverse quantization matrix for each of the N indices. The N indices may be preset based on information on the current block (e.g., prediction mode, size, luma and chroma information, etc.) supported by the decoding apparatus. In addition, the inverse quantization matrix for N indices may be calculated using a list of delta inverse quantization data for the N indices.

For each of the N indices, the inverse quantization matrix generator 504 calculates a reference index using the index and the delta index, and calculates a predictive inverse quantization matrix based on the reference inverse quantization matrix indicated by the reference index. When the delta index is zero, the predictive inverse quantization matrix may be set to a constant. For each of the N indices, the inverse quantization matrix generator 504 may generate delta inverse quantized data from the delta coefficients, and generate an inverse quantization matrix using the predictive inverse quantization matrix and the delta inverse quantized data. For example, the predictive inverse quantization matrix and the delta inverse quantized data may be added to each other to generate an inverse quantization matrix.

As the reference inverse quantization matrix, an inverse quantization matrix indicated by the reference index may be reused.

In the case of a prediction mode using only the reference inverse quantization matrix, the inverse quantization matrix generator 504 may generate an inverse quantization matrix using only the predictive inverse quantization matrix by setting the delta inverse quantized data to zero.

In this embodiment, the inverse quantization matrix may have various sizes, forms, and coefficients. The decoding apparatus may derive information on the inverse quantization matrix using at least one of the method of using fixed values according to an agreement between the encoding/decoding apparatuses, the method of transmitting inverse quantization-related information in the form of a list from the encoding apparatus to the decoding apparatus, or the method of transmitting inverse quantization information for updating a part of fixed values.

Based on the list of inverse quantization matrices generated as described above, the decoding apparatus may select an inverse quantization matrix using an index inferred from the information on the current block.

In this embodiment, the index of an inverse quantization matrix may be inferred using at least one of the method of directly transmitting an index from the encoding apparatus to the decoding apparatus, the method of generating an inference index based on the information on a prediction block of the current block and information on a residual signal, and the method of generating an inferred index from an index of an inverse quantization matrix of a pre-decoded neighboring block, or the method of adding a delta index transmitted from the encoding apparatus to the inference index.

Figure 10:
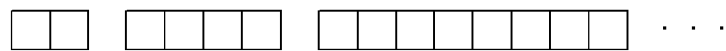
FIG. 10 is an exemplary diagram for a form of an inverse quantization matrix according to an embodiment of the present disclosure.
Figure 10:
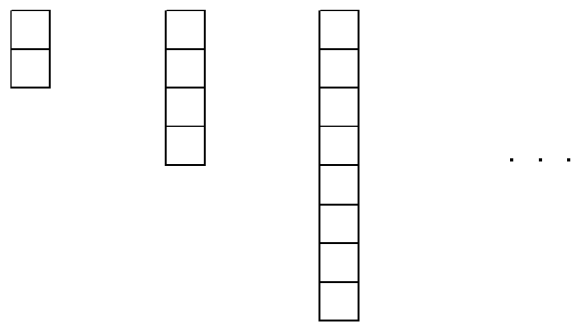
Figure 10:
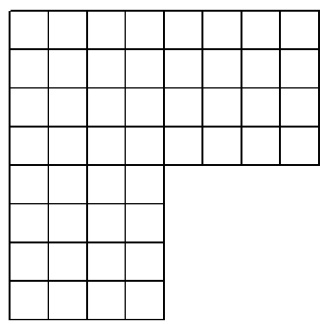
Figure 10:
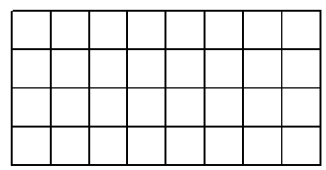
Figure 10:
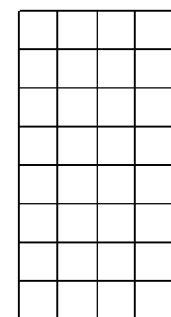

FIG. 10 is an exemplary diagram for a form of an inverse quantization matrix according to an embodiment of the present disclosure.

In this embodiment, the inverse quantization matrix may be an n-dimensional square matrix (where n is a natural number). The dimension n of the inverse quantization matrix may be adaptively determined by one or more of the dimension of an inverse transform block, the dimension of the prediction block, the dimension of the residual signal, or the dimension of a reconstructed signal of the current block.

In another embodiment according to the present disclosure, a dimension of an inverse quantization matrix transmitted from the encoding apparatus to the decoding apparatus may not be the same as a dimension of a matrix that is actually applied to inverse quantization. The n-dimensional matrix may be formed from a combination of k-dimensional matrices (where k is a natural number) transmitted from the encoding apparatus and be applied to inverse quantization, and weights and offsets may be considered in the matrix combination operation. For example, using two one-dimensional matrices as illustrated in (a) of FIG. 10, the encoding apparatus may form a two-dimensional matrix and then apply the same to the inverse quantization. The size of the one-dimensional matrices may be adaptively determined according to at least one of the horizontal length and vertical length of the inverse transform block, the size of the inverse transform block, the inverse transform kernel, the number of inverse transforms, the type of the decoded signal, the prediction mode of the prediction block, and temporal layer values of the prediction block and an image contained in the prediction block, or a bit depth.

In another embodiment according to the present disclosure, as illustrated in (b) of FIG. 10, the form of the inverse quantization matrix may be a non-rectangular shape or a rectangular shape. These shapes may be adaptively determined or derived according to at least one of the horizontal length and vertical length of the inverse transform block, the size of the inverse transform block, the inverse transform kernel, the number of inverse transforms, the type of the decoded signal, the prediction mode of the prediction block, and temporal layer values of the prediction block and an image contained in the prediction block, or a bit depth. That is, based on this information, the form of the inverse quantization matrix may be determined or derived using at least one of the method of directly transmitting the form of the inverse quantization matrix from the encoding apparatus to the decoding apparatus, the method of transmitting list and index information for inducing the form of the matrix, or the method of inducing the form by a rule agreed between the encoding apparatus and the decoding apparatus without transmission of extra information.

In this embodiment, the coefficients of the inverse quantization matrix may have a value greater than or equal to zero. The coefficients of the inverse quantization matrix may be limited to non-zero values.

As described above, the coefficients of the inverse quantization matrix may be generated using delta coefficients.

In this embodiment, the coefficients of the inverse quantization matrix may be transmitted using at least one of the method of directly transmitting the values of the coefficients from the encoding apparatus to the decoding apparatus, the method of transmitting delta coefficients, or the method of transmitting a delta between the current inverse quantization matrix and an inverse quantization matrix having a previous index for the index for the current inverse quantization matrix list. An aspect of the present disclosure relates to a method of transmitting delta coefficients and a method of transmitting a delta between the current inverse quantization matrix and an inverse quantization matrix having a previous index. That is, the coefficients transmitted in the bitstream are delta coefficients between the previous coefficients and the current coefficients in scan order. An intermediate inverse quantization matrix is generated by adding the transmitted delta coefficients and the previous coefficients. This intermediate inverse quantization matrix represents delta inverse quantized data in the present disclosure. The intermediate inverse quantization matrix means the delta between the current inverse quantization matrix and the inverse quantization matrix having the previous index. Therefore, the current inverse quantization matrix may be calculated by adding the intermediate inverse quantization matrix and the inverse quantization matrix having the previous index. When the coefficients have a value greater than or equal to 1, all coefficients may be transmitted using the methods described above based on the coefficient value −1.

As described above, only K delta coefficients (where K is a natural number) corresponding to some of the coefficients of the inverse quantization matrix may be transmitted. In the inverse quantization matrix, a region in which the delta coefficients are transmitted is generated using the transmitted K delta coefficients. The remaining region of the inverse quantization matrix in which the delta coefficients are not transmitted may be set to 0 or a predefined fixed value. Alternatively, while scanning a 2D matrix corresponding to the inverse quantization matrix, the corresponding coefficients of the inverse quantization matrix may be generated using K delta coefficients, but the remaining region of the inverse quantization matrix in which the delta coefficients are not transmitted may be padded with a value generated using the coefficient at the position that has been scanned immediately before.

For example, when the size of the inverse quantization matrix is 8×8, delta coefficients necessary for generating the bottom right 4×4 portion of the inverse quantization matrix may not be transmitted by a bitstream. Delta inverse quantization data padded with a predefined fixed value may be used to generate an inverse quantization matrix for the bottom right 4×4 region. Alternatively, delta inverse quantization data generated using a delta coefficient decoded immediately before in the scan order of the inverse quantization matrix may be used. In generating the remaining portion of the inverse quantization matrix except the bottom right 4×4 portion, delta inverse quantization data having a portion generated based on K delta coefficients may be used.

The values of the K coefficients may be directly transmitted or delta coefficients from the previous coefficients may be transmitted.

When a coefficient is transmitted in the form of a delta between a current coefficient value and a previous coefficient value or a delta between the current inverse quantization matrix and an inverse quantization matrix indicated by the previous index, the coefficient may have a negative value. In this embodiment, the coefficient value may be divided and transmitted in the form of a sign and an absolute value thereof.

The inverse quantization matrix generator 504 may select an inverse quantized DC as a DC item of the inverse quantization matrix indicated by the inference ID. The DC item means the top left component of the inverse quantization matrix. In order to select an inverse quantized DC, the inverse quantization matrix generator 504 generates a list of inverse quantized DCs for M indices. This list contains an inverse quantized DC for each of the M indices. In addition, the inverse quantized DCs for the M indices may be calculated using a list of delta inverse quantized DCs for the M indices.

For each of the M indices, a predictive inverse quantized DC may be calculated using the delta index. When the delta index is zero, the predictive inverse quantized DC may be set to a constant. For each of the M indices, the inverse quantization matrix generator 504 may generate a delta inverse quantized DC from the delta coefficient, and calculate the inverse quantized DC using the predictive inverse quantized DC and the delta inverse quantized DC.

Transmission and derivation of the inverse quantization matrix for the chroma component may be performed in the same manner as the transmission and derivation process of the inverse quantization matrix described above. In addition, without being transmitted separately, the inverse quantization matrix for the chroma component may utilize a first matrix derived by applying a process such as downsampling, sub-sampling, or filtering to the inverse quantization matrix of the luma component according to the sampling rate of the luma component and the chroma component. In addition, a second matrix for which a weight and an offset are considered in the first matrix may be used as an inverse quantization matrix for the chroma component. The weight and offset may be transmitted on a per transform quantization block basis. The weight and offset transmitted from the higher end of the transform quantization block may be shared and used. At least one of the method of transmitting a list of weights and offsets from a higher end and deriving an index of the list from each chroma component, and the method of receiving an index may be used. In addition, the weights and offsets constituting the list may be directly transmitted or a delta between a current value and a previous value may be transmitted.

The transform coefficient generator 506 according to the present embodiment generates transform coefficients from the quantized coefficients using the quantization parameter and the selected inverse quantization matrix. The quantization parameter is equally applied to the entire quantized coefficients, and the inverse quantization matrix may be differentially applied to the quantized coefficients for each component.

The transform coefficient generator 506 generates reconstructed quantized coefficients by multiplying the quantization parameter by the quantized coefficients. The transform coefficient generator 506 calculates a scaling matrix using the selected inverse quantization matrix. In addition, the DC item of the scaling matrix may be replaced the selected inverse quantized DC.

In this embodiment, the sizes of the inverse quantization matrix and the scaling matrix may be different. In this case, the transform coefficient generator 506 may generate a scaling matrix by up-sampling the inverse quantization matrix.

When scaling for a quantized coefficient is not applied or a transform skip mode is applied, the transform coefficient generator 506 sets the components of the scaling matrix to the same constant, thereby canceling the influence of the inverse quantization matrix in generating transform coefficients.

The transform coefficient generator 506 generates transform coefficients to be delivered to the inverse transformer 430 by multiplying the scaling matrix by the reconstructed quantized coefficients.

Figure 11:
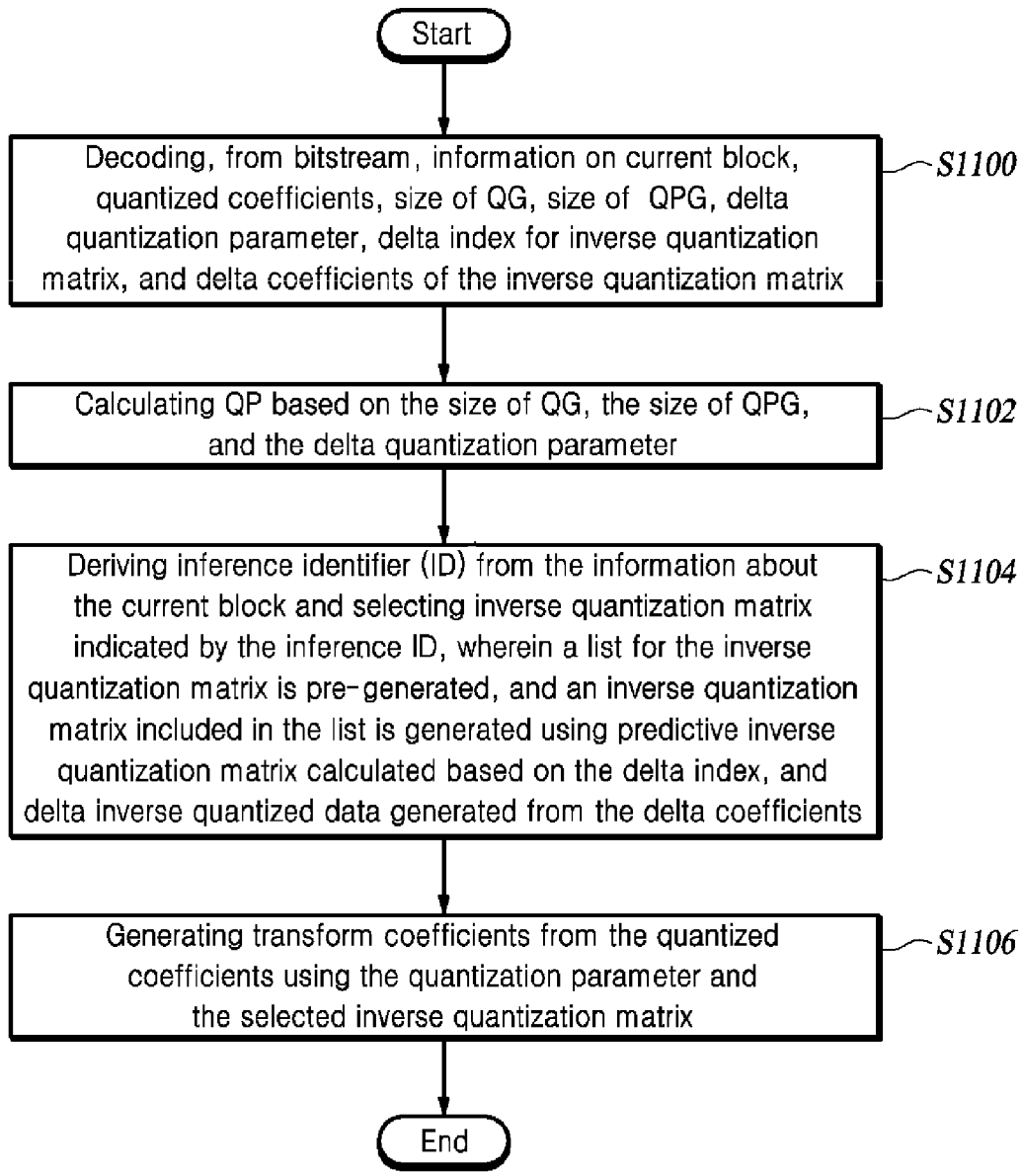
FIG. 11 is a flowchart of an inverse quantization method according to an embodiment of the present disclosure.

FIG. 11 is a flowchart of an inverse quantization method according to an embodiment of the present disclosure.

The inverse quantization device 500 according to the embodiment of the present disclosure decodes, from a bitstream, information on a current block, quantized coefficients, a size of a QG, a size of a QPG, a delta quantization parameter (hereinafter, delta QP), a delta index for an inverse quantization matrix, and delta coefficients of the inverse quantization matrix (S1100).

The information on the current block may include information necessary for generation of a prediction block and a residual signal and reconstruction of the current block. It may include, for example, a prediction mode, a size of the current block, and information about whether the current block is luma or chroma.

In the inverse quantization device 500, the QP (actually, delta QP) may be applied on a per QG basis. Accordingly, the delta QP may not be transmitted from the encoding apparatus on a per TU basis, but may be transmitted on a basis of a larger QG.

When the sizes of the QG and the QPG are not equal to each other, the inverse quantization device 500 may decode the size of the QPG from the bitstream. The QG may include one or more QPGs, or the QPG may include one or more QGs, and each of the QP and QPG cannot exist across boundary of each other.

In this embodiment, an inverse quantization matrix is generated using a predictive quantization matrix and delta inverse quantized data. In addition, a direct current (DC) item of the inverse quantization matrix is generated using predictive inverse quantized DC and delta inverse quantized DC.

The delta index for the inverse quantization matrix may be used in calculating the predictive quantization matrix and the predictive inverse quantized DC.

The delta coefficients of the inverse quantization matrix may be used in calculating a list of delta inverse quantized data and a list of delta inverse quantized DCs. The list of delta inverse quantized data includes delta inverse quantized data for each of N indices (where N is a natural number), and the list of delta inverse quantized DCs includes a delta inverse quantized DC for each of M indices (where M is a natural number less than N).

The inverse quantization device 500 calculates a QP based on the size of QG, the size of QPG, and the delta QP (S1102).

When the QP and QPG have the same size, the inverse quantization device 500 may predict a QP for the QG by averaging the QPs corresponding to the positions above and on the left of the top left position of the QG, and then calculate a QP for the QG by adding the delta QP of the top left position of the QG to the predicted QP for the QG.

When the size of the QG is larger than the size of the QPG, that is, when the QG includes a plurality of QPGs, the inverse quantization device 500 may predict the QP for each QPG by averaging the QPs corresponding to the positions above and on the left of the top left position of each QPG, and then calculate a QP for each QPG by adding the delta QP of the top left position of the QG to the predicted QP for each QPG.

On the other hand, when the size of the QG is smaller than the size of the QPG, that is, when the QPG includes a plurality of QGs, the inverse quantization device 500 may predict the QP for the QPG by averaging the QPs corresponding to the positions above and on the left of the top left position of the QPG, and then calculate a QP for each QG by adding the delta QP of the top left position of each QG to the predicted QP for the QPG.

The inverse quantization device 500 calculates an inference Identifier (ID) from information on the current block, and selects an inverse quantization matrix indicated by the inference ID (S1104).

The inverse quantization device 500 generates an inference ID using the information on the current block (e.g., prediction mode, size, luma and chroma information, etc.). The inverse quantization device 500 selects an inverse quantization matrix indicated by the inference ID in the list of inverse quantization matrices.

For selection of an inverse quantization matrix, the inverse quantization device 500 generates a list of inverse quantization matrices for N indices. This list may include an inverse quantization matrix for each of the N indices. The N indices may be preset based on information on the current block (e.g., prediction mode, size, luma and chroma information, etc.) supported by the decoding apparatus. In addition, the inverse quantization matrix for N indices may be calculated using a list of delta inverse quantized data for the N indices.

For each of the N indices, the inverse quantization device 500 calculates a reference index using the index and the delta index, and calculates a predictive inverse quantization matrix based on the reference inverse quantization matrix indicated by the reference index. When the delta index is zero, the predictive inverse quantization matrix may be set to a constant. For each of the N indices, the inverse quantization device 500 may generate delta inverse quantized data from the delta coefficients, and generate an inverse quantization matrix using the predictive inverse quantization matrix and the delta inverse quantized data. For example, the predictive inverse quantization matrix and the delta inverse quantized data may be added to each other to generate an inverse quantization matrix.

As the reference inverse quantization matrix, an inverse quantization matrix indicated by the reference index may be reused.

Based on the list of inverse quantization matrices generated as described above, the decoding apparatus may select an inverse quantization matrix using an index inferred from the information on the current block.

In this embodiment, the index of an inverse quantization matrix may be inferred using at least one of the method of directly transmitting an index from the encoding apparatus to the decoding apparatus, the method of generating an inference index based on the information on a prediction block of the current block and information on a residual signal, and the method of generating an inference index from an index of an inverse quantization matrix of a pre-decoded neighboring block, or the method of adding a delta index transmitted from the encoding apparatus to the inference index.

As described above, the coefficients of the inverse quantization matrix may be generated using delta coefficients.

In this embodiment, the coefficients of the inverse quantization matrix may be transmitted using at least one of the method of directly transmitting the values of the coefficients from the encoding apparatus to the decoding apparatus, the method of transmitting delta coefficients, or the method of transmitting a delta between the current inverse quantization matrix and an inverse quantization matrix having a previous index for the index for the current inverse quantization matrix list.

The inverse quantization device 500 may select an inverse quantized DC as a DC item of the inverse quantization matrix indicated by the inference ID. The DC item means the top left component of the inverse quantization matrix. In order to select an inverse quantized DC, the inverse quantization device 500 generates a list of inverse quantized DCs for M indices. This list contains an inverse quantized DC for each of the M indices. In addition, the inverse quantized DCs for the M indices may be calculated using a list of delta inverse quantized DCs for the M indices.

For each of the M indices, a predictive inverse quantized DC may be calculated using the delta index. When the delta index is zero, the predictive inverse quantized DC may be set to a constant. For each of the M indices, the inverse quantization device 500 may generate a delta inverse quantized DC from the delta coefficients, and calculate the inverse quantized DC using the predictive inverse quantized DC and the delta inverse quantized DC.

The inverse quantization device 500 generates transform coefficients from the quantized coefficients using the quantization parameter and the selected inverse quantization matrix (S1106). The inverse quantization device 500 generates reconstructed quantized coefficients by multiplying the quantization parameter by the quantized coefficients.

The inverse quantum device 500 calculates a scaling matrix using the selected inverse quantization matrix. In addition, the DC item of the scaling matrix may be replaced the selected inverse quantized DC. The inverse quantum device 500 generates transform coefficients by multiplying the scaling matrix by the reconstructed quantized coefficients.

As described above, according to the present embodiment, an inverse quantization device and method for acquiring quantized coefficients, calculating a quantization parameter in a unit of a quantization group or a quantization parameter prediction group, generating an inverse quantization matrix for adaptive quantization, and generating transform coefficients from the quantized coefficients using the quantization parameter and the inverse quantization matrix is provided. Thereby, compression performance of video encoding and decoding apparatuses may be improved.

While each flowchart according to the present embodiment illustrates that the respective operations are sequentially executed, embodiments are not necessarily limited thereto. In other words, the operations illustrated in the flowcharts may be executed in a different order, or one or more of the operations may be executed in parallel. Accordingly, the flowcharts are not limited to a time series order.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding apparatus, comprising:
   a memory; and
   one or more processors configured to:
      decode, a bitstream to obtain information about a current block, information about quantized coefficients, information about a quantization parameter, a delta index for an inverse quantization matrix, and delta coefficients of the inverse quantization matrix;
      calculate a quantization parameter based on the information about the quantization parameter;
      derive an inference identifier (ID) from the information about the current block and selecting an inverse quantization matrix indicated by the inference ID, wherein a list for the inverse quantization matrix is pre-generated, and an inverse quantization matrix included in the list is generated using a predictive inverse quantization matrix calculated based on the delta index, and delta inverse quantized data generated from the delta coefficients;
      generate transform coefficients from the quantized coefficients using the quantization parameter and the selected inverse quantization matrix;
      generate residual signals for the current block by inversely transforming the transform coefficients; and
      reconstruct the current block using the residual signals,
   wherein delta coefficients corresponding to a part of the inverse quantization matrix included in the list are not decoded.

2. The video decoding apparatus of claim 1, wherein the information about the quantization parameter comprises a size of a quantization group (QG) and a delta quantization parameter.

3. The video decoding apparatus of claim 1, wherein delta coefficients corresponding to a part of the inverse quantization matrix are not decoded.

4. The video decoding apparatus of claim 3, wherein, when a size of the inverse quantization matrix is 8×8, delta coefficients required for generation of a bottom right 4×4 portion of the inverse quantization matrix are not included in the bitstream.

5. The video decoding apparatus of claim 1, wherein, when the delta index is zero, the inverse quantization matrix is generated using a predictive inverse quantization matrix having all components set to the same constant, and the delta inverse quantized data.

6. The video decoding apparatus of claim 1, wherein, in a prediction mode using only the delta index, the inverse quantization matrix is generated using only the predictive inverse quantization matrix by setting the delta inverse quantized data to zero.

7. The video decoding apparatus of claim 1,
   wherein the inverse quantization matrix generator selects an inverse quantized Direct Current (DC) as a DC item of the inverse quantization matrix indicated by the inference ID,
   wherein a list of the inverse quantized DC is pre-generated, and inverse quantized DCs included in the list is calculated using a predictive inverse quantized DC based on the delta index, and a delta inverse quantized DC generated from the delta coefficients.

8. The video decoding apparatus of claim 1, wherein, in a prediction mode using only the delta index, the inverse quantization matrix is generated using only the predictive inverse quantization matrix by setting the delta inverse quantized data to zero.

9. A non-transitory computer readable medium storing a bitstream containing encoded data for a block of video data, transform coefficients of the block being generated from the bitstream by processes of:
   decoding information about a current block, information about quantized coefficients, information about a quantization parameter, a delta index for an inverse quantization matrix, and delta coefficients of the inverse quantization matrix from a bitstream;
   calculating a quantization parameter based on the information about the quantization parameter;
   deriving an inference identifier (ID) from the information about the current block and selecting an inverse quantization matrix indicated by the inference ID, wherein a list for the inverse quantization matrix is pre-generated, and an inverse quantization matrix included in the list is generated using a predictive inverse quantization matrix calculated based on the delta index, and delta inverse quantized data generated from the delta coefficients; and generating transform coefficients from the quantized coefficients using the quantization parameter and the selected inverse quantization matrix, wherein delta coefficients corresponding to a part of the inverse quantization matrix included in the list are not decoded, wherein the information about the current block comprises a size of the current block.

* * * * *